(12) United States Patent
Nishino et al.

(10) Patent No.: US 10,566,135 B2
(45) Date of Patent: *Feb. 18, 2020

(54) METHOD OF MANUFACTURING STACKED BODY AND STACKED BODY

(71) Applicant: Murata Manufacturing Co., Ltd., Nagaokakyo-shi, Kyoto-fu (JP)

(72) Inventors: Kosuke Nishino, Nagaokakyo (JP); Kuniaki Yosui, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/226,722

(22) Filed: Dec. 20, 2018

(65) Prior Publication Data
US 2019/0122817 A1  Apr. 25, 2019

Related U.S. Application Data

(63) Continuation of application No. 14/930,681, filed on Nov. 3, 2015, now Pat. No. 10,204,735, which is a (Continued)

(30) Foreign Application Priority Data

Feb. 27, 2014  (JP) ................................. 2014-036816
May 28, 2014  (JP) ................................. 2014-109665

(51) Int. Cl.
*G02B 7/02* (2006.01)
*H05K 7/00* (2006.01)
(Continued)

(52) U.S. Cl.
CPC .............. *H01F 41/02* (2013.01); *G03B 5/02* (2013.01); *H01F 7/066* (2013.01); *H01F 7/20* (2013.01);
(Continued)

(58) Field of Classification Search
CPC ...... G02B 7/14; G02B 25/002; G02B 15/173; G02B 7/04; G02B 7/021; G02B 7/10; G02B 7/02; G02B 7/102; H01F 27/2847; H01F 27/303; H01F 17/003; H01F 41/127; H01F 5/02; H01F 37/005; H01F 6/06; H01L 23/49836; H01L 23/5227; H01L 7/0932;
(Continued)

(56) References Cited

U.S. PATENT DOCUMENTS

2010/0175250 A1* 7/2010 Kamiya ................. H05K 1/186
29/846

OTHER PUBLICATIONS

Nishino et al., "Method of Manufacturing Electromagnet, and Electromagnet", U.S. Appl. No. 14/930,681, filed Nov. 3, 2015.

* cited by examiner

*Primary Examiner* — Dawayne Pinkney
(74) *Attorney, Agent, or Firm* — Keating & Bennett, LLP

(57) ABSTRACT

An electromagnet includes a stacked body formed by stacking and thermocompression-bonding a plurality of insulating base materials having thermoplasticity and including wound linear conductors which define a spiral coil. In a region of each of the insulating base materials surrounded by each of the wound linear conductors, each of low mobility members is formed of a material having mobility lower than that of the insulating base materials at a temperature upon thermocompression-bonding of the insulating base materials.

7 Claims, 12 Drawing Sheets

Related U.S. Application Data continuation of application No. PCT/JP2015/054940, filed on Feb. 23, 2015.

(51) Int. Cl.
| | |
|---|---|
| *H01F 41/02* | (2006.01) |
| *H01F 41/04* | (2006.01) |
| *H01F 7/06* | (2006.01) |
| *G03B 5/02* | (2006.01) |
| *H01F 7/20* | (2006.01) |

(52) U.S. Cl.
CPC ............ *H01F 41/04* (2013.01); *H01F 41/041* (2013.01); *H01F 2007/068* (2013.01)

(58) Field of Classification Search
CPC ....... H01L 6/06; H01L 17/006; G11B 7/0935; G11B 7/0932
USPC ......... 361/760–778; 174/259–264; 359/811–830; 257/531, 547; 336/221–225, 199–200, 205, 208, 232
See application file for complete search history.

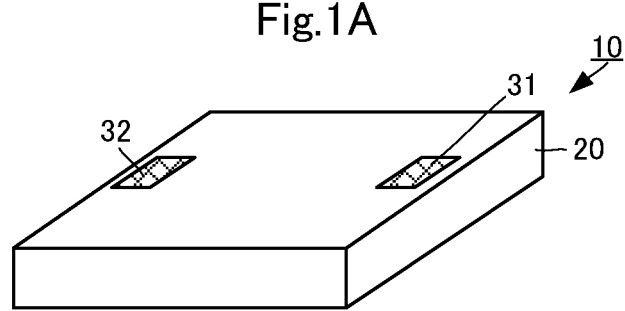
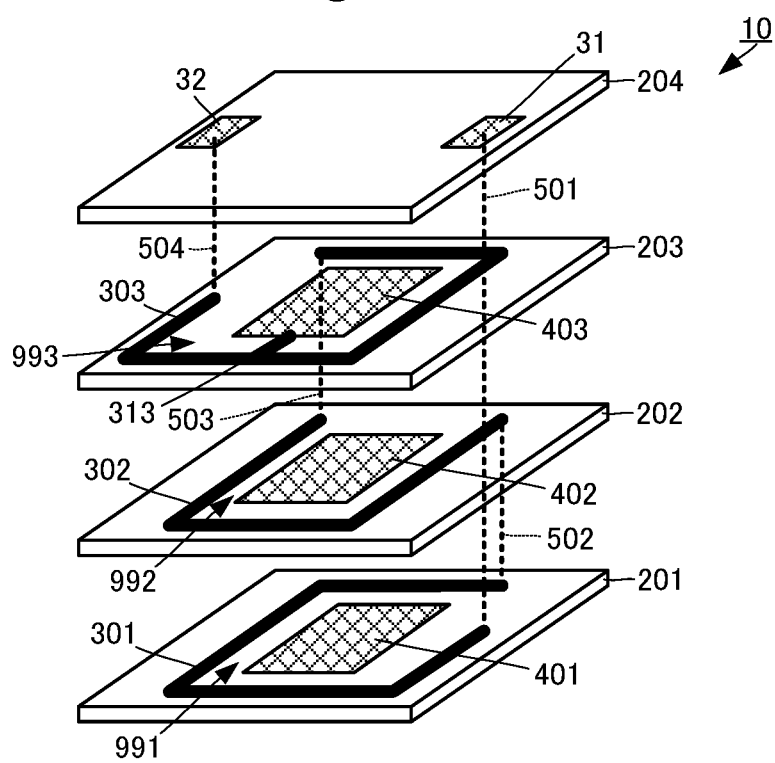

PRIOR ART

METHOD OF MANUFACTURING STACKED BODY AND STACKED BODY

BACKGROUND OF THE INVENTION

1. Field of the Invention

The present invention relates to a method of manufacturing an electromagnet including a stacked body, and the electromagnet.

2. Description of the Related Art

Conventionally, electromagnets of various structures which are used for voice coil motors and the like have been disclosed. JP 62-77048 A discloses a voice coil motor which includes an electromagnet formed by using a stacked body.

The electromagnet disclosed in JP 62-77048 A includes a plurality of layers of insulating base materials on which linear conductors having spiral shapes when seen from a plan view are formed. The linear conductors which are formed on adjacent insulating base materials in a stacking direction and have spiral shapes when seen from a plan view, spiral in opposite winding directions. Inner circumferential ends of a pair of linear conductors whose winding directions are opposite are connected by a conductor which penetrates the insulating base materials.

When thermoplastic resin is used for the insulating base materials to manufacture an electromagnet of such a structure, the following problem occurs. FIGS. 12A and 12B are sectional views illustrating the problem of a stacked electromagnet which uses insulating base materials made of thermoplastic resin. FIG. 12A illustrates a state before thermocompression bonding, and FIG. 12B illustrates a state after the thermocompression bonding.

First, as illustrated in FIG. 12A, wound linear conductors 301, 302 and 303 are formed on surfaces of a plurality of insulating base materials 201, 202 and 203. A plurality of insulating base materials 201, 202, 203 and 204 (201 to 204) is stacked sandwiching the linear conductors 301, 302 and 303 between the linear base materials.

In this regard, the insulating base materials 201, 202 and 203 are stacked such that positions of the wound linear conductors 301, 302 and 303 overlap when seen from the stacking direction. Thus, the positions of the wound linear conductors 301, 302 and 303 are overlaid and the wound linear conductors 301, 302 and 303 are successively connected by a via conductor which is not illustrated to form one coil.

However, according to this configuration, when the insulating base materials 201 to 204 are thermocompression-bonded to form a stacked body 20P, the insulating base materials 201 to 204 are thermoplastic and therefore move.

In this regard, the number of layers (the number of layers of insulating base materials+the number of layers of linear conductors) which are stacked in a region in which the wound linear conductors 301, 302 and 303 are formed is larger than the number of layers (the number of layers of insulating base materials) which are stacked in a region 909 surrounded by the wound linear conductors 301, 302 and 303. Hence, when uniaxial pressing is performed upon thermocompression bonding, a pressure to be applied to a region in which the wound linear conductors 301, 302 and 303 are formed is larger than a pressure to be applied to the region 909. Further, the linear conductors 301, 302 and 303 do not melt at a temperature at which the insulating base materials melt.

Hence, the insulating base material between the linear conductors moves to another region, and thereby changes a positional relationship of each linear conductor in each layer. As illustrated in FIG. 12B in particular, at position at which the linear conductors are formed near the region 909, mobility of the insulating base material is great due to the difference in the number of layers. Hence, the linear conductors 301, 302 and 303 move, and the linear conductors 301, 302 and 303 formed in different layers unnecessarily approach each other and cause short-circuiting with the linear conductors in the different layers in some cases. Further, even when isotropic pressing is performed upon thermocompression bonding, significant movement and deformation occur in the region 909, and then the linear conductors move.

SUMMARY OF THE INVENTION

Preferred embodiments of the present invention provide an electromagnet manufacturing method to manufacture a reliable electromagnet whose shape is stable even in a structure in which insulating base materials of thermoplastic resin on which wound linear conductors are formed are stacked, and also provide the electromagnet.

A preferred embodiment of the present invention relates to a method of manufacturing an electromagnet which is formed by thermocompression-bonding a plurality of insulating base materials having wound linear conductors formed thereon and made of thermoplastic resin, and which includes a coil defined by the wound linear conductors, and includes the following features. An electromagnet manufacturing method according to a preferred embodiment of the present invention includes a step of forming the wound linear conductors on the plurality of insulating base materials. The electromagnet manufacturing method includes a step of arranging a low mobility member whose mobility is lower than a mobility of the thermoplastic resin at a temperature upon the thermocompression-bonding of the thermoplastic resin, in a region of at least one of the plurality of insulating base materials surrounded by each of the wound linear conductors. The electromagnet manufacturing method includes a step of stacking and thermocompression-bonding the plurality of insulating base materials.

According to this electromagnet manufacturing method, the low mobility member prevents movement of thermoplastic resin near the low mobility member. Consequently, it is possible to prevent movement of the linear conductors caused by the movement of the thermoplastic resin upon thermocompression bonding. Hence, the positional relationship of the wound linear conductor in each layer hardly changes from a state before thermocompression bonding, i.e., from a stacking state. Consequently, it is possible to stabilize a shape of the coil defined by the wound linear conductors, and obtain a reliable electromagnet.

Further, according to an electromagnet manufacturing method according to a preferred embodiment of the present invention, preferably, the low mobility member is made of the same material as a material of the wound linear conductors, and the step of forming one of the wound linear conductors and the step of arranging the low mobility member are simultaneously performed.

According to this electromagnet manufacturing method, it is possible to simultaneously form the low mobility members and the linear conductors and, consequently, simplify the manufacturing process. Further, the electromagnet is substantially controlled according to a direct current signal and is not controlled according to a high frequency signal. Therefore, even when the low mobility members which are conductors are provided in regions surrounded by the wound linear conductors which define the coil, an electromagnetic wave generated by the electromagnet is hardly shielded by the low mobility members.

Further, according to the electromagnet manufacturing method according to a preferred embodiment of the present invention, preferably, the conductor which defines the low mobility member is formed integrally with one of the linear conductors provided on the same insulating base material.

According to this electromagnet manufacturing method, it is possible to simplify the manufacturing process and prevent movement of the low mobility members, too.

Further, an electromagnet manufacturing method according to a preferred embodiment of the present invention is preferably the following method. The conductor which defines the low mobility member is provided on each of a plurality of insulating base materials. The conductors which define the low mobility member, being provided on a plurality of insulating base materials, are connected each other by a connection conductor which is elongated in a stacking direction in which the plurality of insulating base materials are stacked.

According to this electromagnet manufacturing method, it is possible to prevent movement of the low mobility members, too.

Further, according to an electromagnet manufacturing method according to a preferred embodiment of the present invention, preferably, the connection conductor which is connected to the low mobility member, and a coil connection conductor which defines the coil together with the wound linear conductors are simultaneously formed.

According to this electromagnet manufacturing method, it is possible to further simplify the manufacturing process.

Further, another preferred embodiment of the present invention provides to an electromagnet in which a coil defined by wound linear conductors and including an axis in a stacking direction is provided in a stacked body including a plurality of insulating base materials on which the wound linear conductors are located and is made of thermoplastic resin, and includes the following features. In an electromagnet according to a preferred embodiment of the present invention, a low mobility member whose mobility is lower than mobility of the thermoplastic resin at a temperature upon thermocompression-bonding of the thermoplastic resin is located in a region surrounded by each of the wound linear conductors when the stacked body is seen from the stacking direction.

According to this configuration, the low mobility members prevent movement of the insulating base materials made of thermoplastic resin, and therefore movement of the wound linear conductors is also prevented. Hence, the positional relationship of the wound linear conductor in each layer hardly changes from a state before thermocompression bonding, i.e., from a stacking state. Consequently, a shape of the coil defined by the wound linear conductors stabilizes.

In case of the electromagnet in particular, as wound linear conductors are more densely arranged, a greater torque is produced by the compact linear conductors. However, the linear conductors approach each other and therefore are likely to cause short-circuiting. Further, a torque becomes greater as a distance from a coil winding center to each linear conductor in the electromagnet is longer. However, when the distance from the coil winding center to the linear conductor is longer, an area surrounded by the linear conductor becomes larger and each insulating base material is more likely to move. However, by using this configuration, it is possible to prevent movement of the insulating base materials even when the areas surrounded by the linear conductors become larger. That is, the configuration according to a preferred embodiment of the present invention more effectively functions for the structure of the electromagnet.

Further, according to an electromagnet according to a preferred embodiment of the present invention, preferably, the low mobility member is made of the same material as a material of the wound linear conductors and is integrally provided with one of the wound linear conductors provided on the same insulating base material.

According to this configuration, the low mobility members and the linear conductors are physically connected. Consequently, it is possible to more reliably prevent movement of the linear conductors and the low mobility members caused by movement of the insulating base materials.

Further, in an electromagnet according to a preferred embodiment of the present invention, the conductor which defines the low mobility member is provided on each of a plurality of insulating base materials, and the conductors which define the low mobility member, being provided on a plurality of insulating base materials, may be connected each other by a connection conductor which is elongated in a stacking direction in which plurality of insulating base materials are stacked.

According to this configuration, the conductors defining the low mobility member provided on each insulating base material are physically connected. Consequently, it is possible to more reliably prevent movement of the linear conductors and the low mobility members caused by movement of the insulating base material.

According to various preferred embodiments of the present invention, it is possible to provide a reliable electromagnet in which insulating base materials of thermoplastic resin on which wound linear conductors are provided are stacked, and whose shape is stable.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 1A and 1B are an external appearance view and an exploded perspective view of an electromagnet according to a first preferred embodiment of the present invention.

DETAILED DESCRIPTION OF THE PREFERRED EMBODIMENTS

Figure 2:
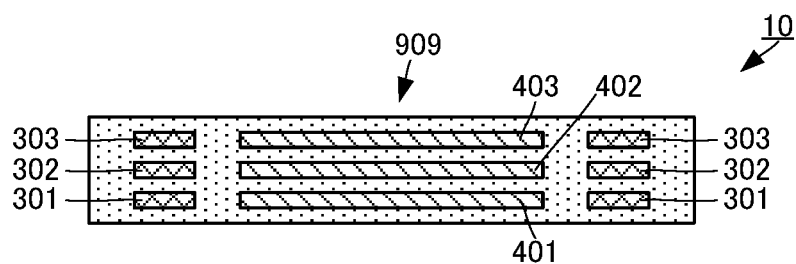
FIG. 2 is a side sectional view of the electromagnet according to the first preferred embodiment of the present invention.
Figure 3:
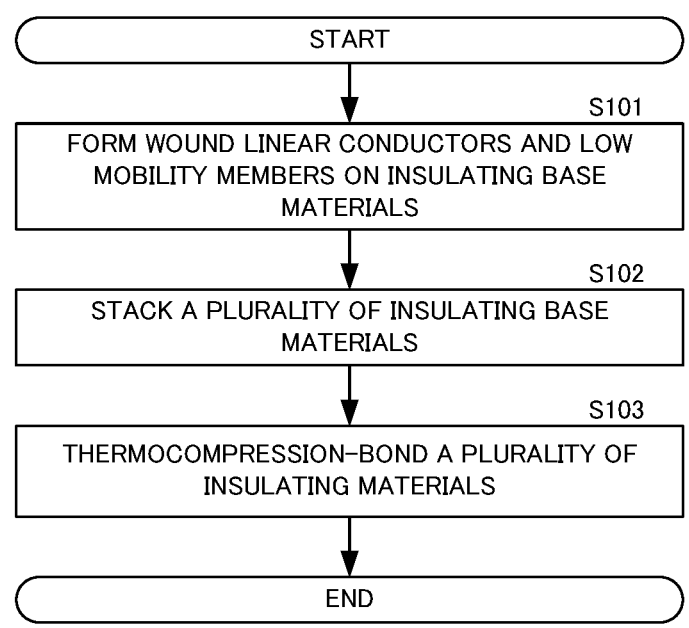
FIG. 3 is a flowchart illustrating a flow of manufacturing the electromagnet according to the first preferred embodiment of the present invention.

An electromagnet and an electromagnet manufacturing method according to the first preferred embodiment of the present invention will be described with reference to the drawings. FIG. 1A is an external appearance view of the electromagnet according to the first preferred embodiment of the present invention. FIG. 1B is an exploded perspective view of the electromagnet according to the first preferred embodiment of the present invention. FIG. 2 is a side sectional view of the electromagnet according to the first preferred embodiment of the present invention.

As illustrated in FIGS. 1A and 1B, an electromagnet 10 includes a stacked body 20 preferably with a cuboid shape. The stacked body 20 is formed preferably by stacking and thermocompression-bonding a plurality of insulating base materials 201, 202, 203 and 204 (201 to 204). A plurality of insulating base materials 201 to 204 is made of sheet thermoplastic resin. The thermoplastic resin is mainly made of, for example, liquid crystal polymers.

On a surface of the insulating base material 201, a wound linear conductor 301 and a low mobility member 401 of a flat shape are formed. The wound linear conductor 301 has a shape elongated along an outer circumference of the surface of the insulating base material 201. The linear conductor 301 is made of a material of high conductivity. For example, the linear conductor 301 is made of copper. One end of the linear conductor 301 is connected to an external connection conductor 31 which is provided on the surface of the insulating base material 204 by a coil connection conductor 501 which penetrates the insulating base materials 202 to 204.

The low mobility member 401 is located in a region surrounded by the wound linear conductor 301. The low mobility member 401 is made of a material having mobility lower than that of the insulating base material 201 at a thermocompression bonding temperature (e.g., about 250° C. to about 350° C.) of the insulating base material 201. For example, the low mobility member 401 is made of the same copper as that of the linear conductor 301. In addition, the low mobility member 401 and the linear conductor 301 are made of the same material, and, consequently, can be simultaneously formed, so that it is possible to simplify a manufacturing process.

On a surface of the insulating base material 202, a wound linear conductor 302 and a low mobility member 402 of a flat shape are provided. The wound linear conductor 302 has a shape elongated along an outer circumference of the surface of the insulating base material 202. The wound linear conductor 302 partially overlaps the linear conductor 301 along an elongation direction when the stacked body 20 is seen from the stacking direction. The linear conductor 302 is made of a material of high conductivity. For example, the linear conductor 302 is made of copper.

One end of the linear conductor 302 and the other end of the linear conductor 301 overlap when seen from the stacking direction. The one end of the linear conductor 302 and the other end of the linear conductor 301 are connected by a coil connection conductor 502 which penetrates the insulating base material 202.

The low mobility member 402 is located in a region surrounded by the wound linear conductor 302. The low mobility member 402 partially overlaps the low mobility member 401 when the stacked body 20 is seen from the plan view.

The low mobility member 402 is made of a material having mobility lower than that of the insulating base material 202 at a thermocompression bonding temperature of the insulating base material 202. For example, the low mobility member 402 is made of the same copper as that of the linear conductor 302 and the low mobility member 401. In addition, the low mobility member 402 and the linear conductor 302 are made of the same material, and, consequently, can be simultaneously formed, so that it is possible to simplify a manufacturing process.

On a surface of the insulating base material 203, a wound linear conductor 303, a low mobility member 403 of a flat shape and an intra-layer connection conductor 313 are provided. The wound linear conductor 303 has a shape elongated along an outer circumference of the surface of the insulating base material 203. The wound linear conductor 303 partially overlaps the linear conductors 301 and 302 along the elongation direction when the stacked body 20 is seen from the stacking direction. The linear conductor 303 is made of a material of high conductivity. For example, the linear conductor 303 is made of copper.

One end of the linear conductor 303 and the other end of the linear conductor 302 overlap when seen from the stacking direction. The one end of the linear conductor 303 and the other end of the linear conductor 302 are connected by a coil connection conductor 503 which penetrates the insulating base material 203.

The low mobility member 403 is located in a region surrounded by the wound linear conductor 303. The low mobility member 403 partially overlaps the low mobility members 401 and 402 when the stacked body 20 is seen from the plan view.

The low mobility member 403 is made of a material having mobility lower than that of the insulating base material 203 at a thermocompression bonding temperature of the insulating base material 203. For example, the low mobility member 403 is made of the same copper as that of the linear conductor 303 and the low mobility members 401 and 402.

The intra-layer connection conductor 313 physically connects the linear conductor 303 and the low mobility member 403. Similar to the low mobility member 403, the intra-layer connection conductor 313 is made of a material having mobility lower than that of the insulating base material 203 at a thermocompression bonding temperature of the insulating base material 203. In addition, this intra-layer connection conductor 313 may be omitted.

The intra-layer connection conductor 313, the linear conductor 303 and the low mobility member 403 are preferably made of the same material, and are preferably formed integrally. That is, the intra-layer connection conductor 313, linear conductor 303 and the low mobility member 403 are preferably formed in one patterning process. In addition, "simultaneous" formation in the present preferred embodiment means that members are formed together in a step which is commonized. By integrally forming the intra-layer connection conductor 313, the linear conductor 303 and the low mobility member 403, it is possible to prevent an influence caused by movement upon thermocompression bonding of the insulating base material 203 and more effectively prevent movement of the linear conductor 303. Further, the intra-layer connection conductor 313, the linear conductor 303 and the low mobility member 403 are made of the same material and are integrally formed, so that it is possible to simplify the manufacturing process.

On a surface of the insulating base material 204, rectangular or substantially rectangular external connection conductors 31 and 32 are provided. The external connection conductors 31 and 32 are made of a material of high conductivity. For example, the external connection conductors 31 and 32 are made of copper.

The external connection conductor 31 is connected to one end of the linear conductor 301 by the coil connection conductor 501 as described above. The external connection conductor 32 is connected to the other end of the linear conductor 303 by a coil connection conductor 504 which penetrates the insulating base material 204.

According to this configuration, it is possible to provide a spiral coil defined by the linear conductors 301, 302 and 303 and the coil connection conductors 502, 503 and 504. In this case, a coil winding axial direction is parallel or substantially parallel to the stacking direction.

Further, as described in the present preferred embodiment, the low mobility members 401, 402 and 403 are used, so that, as illustrated in FIG. 2, when the insulating base materials 201 to 204 made of thermoplastic resin are thermocompression-bonded to form the stacked body 20, it is possible to prevent the linear conductors 301, 302 and 303 from moving.

Consequently, it is possible to provide a reliable coil element which has good coil characteristics. Further, according to the configuration according to the present preferred embodiment, even when areas of regions surrounded by the linear conductors are made larger, the low mobility members 401, 402 and 403 prevent the linear conductors 301, 302 and 303 from moving. Consequently, as described in the present preferred embodiment, according to an aspect where the coil element is the electromagnet 10, it is possible to provide a highly reliable electromagnet of a great torque.

Further, in case of the electromagnet, as wound linear conductors are more densely arranged, a greater torque is produced by compact linear conductors. However, the linear conductors approach each other, and therefore are likely to cause short-circuiting. However, by adopting the configuration and the manufacturing method according to the present preferred embodiment, it is possible to prevent such short-circuiting.

Further, the electromagnet is substantially controlled according to a direct current signal and is not controlled according to a high frequency signal. Therefore, even when the low mobility members which are conductors are provided in regions surrounded by the wound linear conductors which define the coil, an electromagnetic wave generated by the electromagnet is hardly shielded by the low mobility members.

Further, in the present preferred embodiment, the linear conductor 303 and the low mobility member 403 on the surface of the insulating base material 203 are connected by the intra-layer connection conductor 313, so that it is possible to further prevent movement of the linear conductors.

The electromagnet 10 with this configuration can be manufactured by the following example manufacturing method. FIG. is a flowchart illustrating a flow of manufacturing the electromagnet according to the first preferred embodiment of the present invention.

First, an insulating base material made of thermoplastic resin having a conductor (e.g. copper) formed on a single surface is prepared. By performing patterning processing on this insulating base material, a conductor pattern on each of the insulating base materials 201 to 204 in FIG. 1B is formed. More specifically, the linear conductor 301 and the low mobility member 401 are formed on the insulating base material 201. The linear conductor 302 and the low mobility member 402 are formed on the insulating base material 202. The linear conductor 303 and the low mobility member 403 are formed on the insulating base material 203. The linear conductor 303 and the low mobility member 403, and the intra-layer connection conductor 313 are formed on the insulating base material 203 (S101). In this case, the linear conductor 303, the low mobility member 403 and the intra-layer connection conductor 313 are integrally formed.

Further, the external connection conductors 31 and 32 are formed on the fourth insulating base material 204.

Furthermore, at positions at which the coil connection conductors 501, 502, 503 and 504 are formed on the insulating base materials 202, 203 and 204, a through-hole is formed, and a conductive paste is filled in the through-holes.

Next, the insulating base materials 201 to 204 on which conductive patterns have been formed are stacked (S102). In this case, as illustrated in FIG. 1B, the insulating base materials 201 to 204 are stacked such that a coil of a spiral shape whose winding axial direction is parallel or substantially parallel to the stacking direction is formed.

Next, members on which the insulating base materials 201 to 204 have been stacked are thermocompression-bonded to form the stacked body 20 (S103). In this regard, the low mobility members 401, 402 and 403 are provided, so that it is possible to prevent the linear conductors 301, 302 and 303 from moving and manufacture a reliable electromagnet.

In addition, this manufacturing process is preferably performed in a state of a base material from which a plurality of stacked bodies 20 can be formed, and, in this case, a plurality of stacked bodies 20 is formed by cutting the base material after thermocompression bonding.

By using the above manufacturing method, it is possible to easily and reliably manufacture the reliable electromagnet. Further, it is possible to simplify the manufacturing process by simultaneously forming the linear conductors and the low mobility members on the surfaces of the respective insulating base materials. Furthermore, the linear conductor, the low mobility member and the intra-layer connection conductor on the surface of the insulating base material 203 are integrally formed, so that it is possible to simplify the manufacturing process.

In addition, an aspect where the low mobility members preferably are formed on all insulating base materials on which linear conductors have been formed has been described in the present preferred embodiment. However, according to another aspect, a low mobility member may be formed on at least one insulating base material. Further, the intra-layer connection conductor may be provided to each insulating base material.

Figure 4:
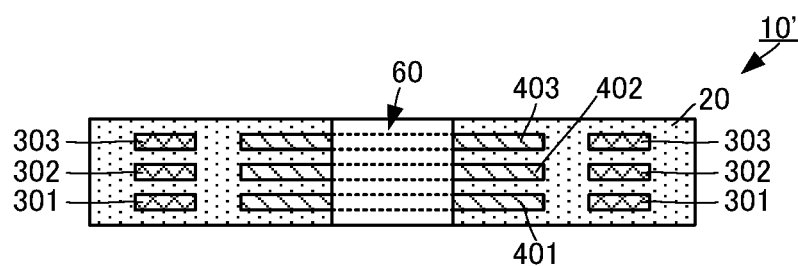
FIG. 4 is a side sectional view of the electromagnet according to another aspect of the first preferred embodiment of the present invention.

The electromagnet with this configuration may employ the following configuration. FIG. 4 is a side sectional view of the electromagnet according to another aspect of the first preferred embodiment of the present invention.

An electromagnet 10' illustrated in FIG. 4 additionally includes a through-hole 60 compared to the electromagnet 10 illustrated in FIGS. 1 and 2. Hence, only differences from the electromagnet 10 will be described.

The through-hole 60 penetrates the stacked body 20 in the stacking direction. The through-hole 60 is provided in a region in which the low mobility members 401, 402 and 403 overlap when the stacked body 20 is seen from the stacking direction.

By providing this through-hole 60, it is possible to easily fix the electromagnet 10' by using a screw inserted through the through hole 60. Further, the low mobility members 401, 402 and 403 are provided, so that a strength of the region of the stacked body 20 provided with the through-hole 60 increases, and it is possible to prevent a damage caused upon screwing. Furthermore, it is possible to highly strongly fix the electromagnet 10'. Still further, the linear conductors are prevented from being misaligned, so that it is possible to prevent misalignment of the linear conductors from moving the through-hole 60 to the positions of the linear conductors when the through-hole 60 is provided. That is, it is possible to prevent the linear conductors from being cut by mistake.

Figure 5:
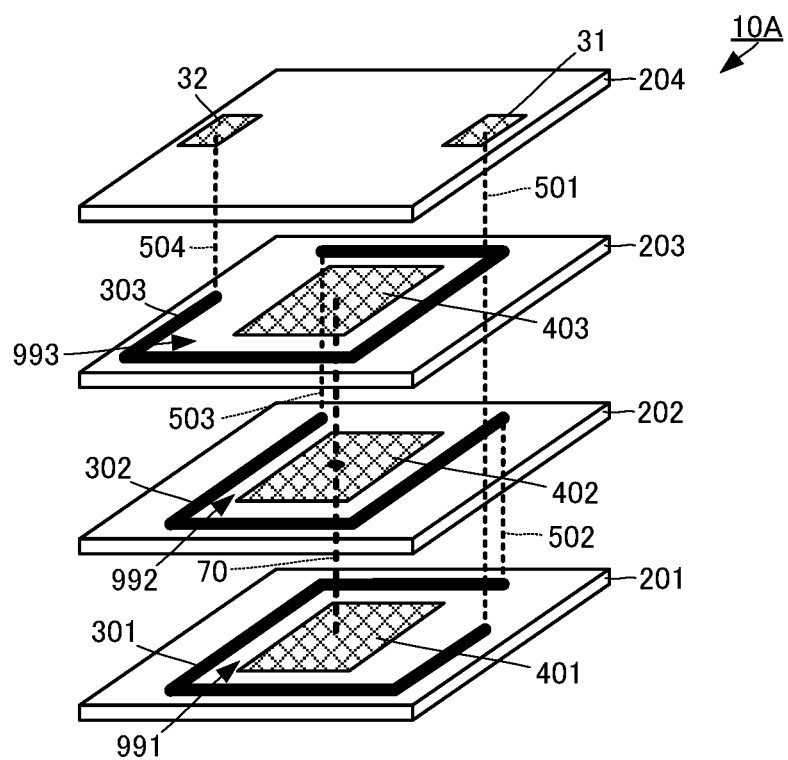
FIG. 5 is an exploded perspective view of the electromagnet according to the second preferred embodiment of the present invention.

Next, an electromagnet according to the second preferred embodiment of the present invention will be described with reference to the drawings. FIG. 5 is an exploded perspective view of the electromagnet according to the second preferred embodiment of the present invention.

An electromagnet 10A according to the present preferred embodiment additionally includes a fixing inter-layer connection conductor 70 without an inter-layer connection conductor 313 compared to an electromagnet 10 according to the first preferred embodiment. A basic method of manufacturing the electromagnet 10A according to the present preferred embodiment is also the same as the electromagnet 10 according to the first preferred embodiment. Hereinafter, only differences from the electromagnet according to the first preferred embodiment will be specifically described.

As illustrated in FIG. 5, the electromagnet 10A includes the fixing inter-layer connection conductor 70. The fixing inter-layer connection conductor 70 has a shape which penetrates insulating base materials 202 and 203 and a low mobility member 402. The fixing inter-layer connection conductor 70 physically connects low mobility members 401, 402 and 403.

By using the fixing inter-layer connection conductor 70, it is possible to fix the low mobility members 401, 402 and 403 even upon thermocompression bonding of insulating base materials 201 to 204. Consequently, it is possible to form the more reliable electromagnet 10A.

This inter-layer connection conductor 70 can be formed in one process of forming a through-hole and a connection conductor together with coil connection conductors 501, 502, 503 and 504 according to the same manufacturing method as the coil connection conductors 501, 502, 503 and 504. In addition, "simultaneous" formation in the present preferred embodiment means that members are formed together in a step which is commonized. Thus, by forming the inter-layer connection conductor 70 in the same process as that of the coil connection conductors 501, 502, 503 and 504, it is possible to manufacture the electromagnet 10A in a more simple manufacturing process.

In addition, an aspect where all low mobility members 401, 402 and 403 are connected with the inter-layer connection conductor 70 has been described in the present preferred embodiment. According to another aspect, at least two low mobility members may be connected.

Figure 6:
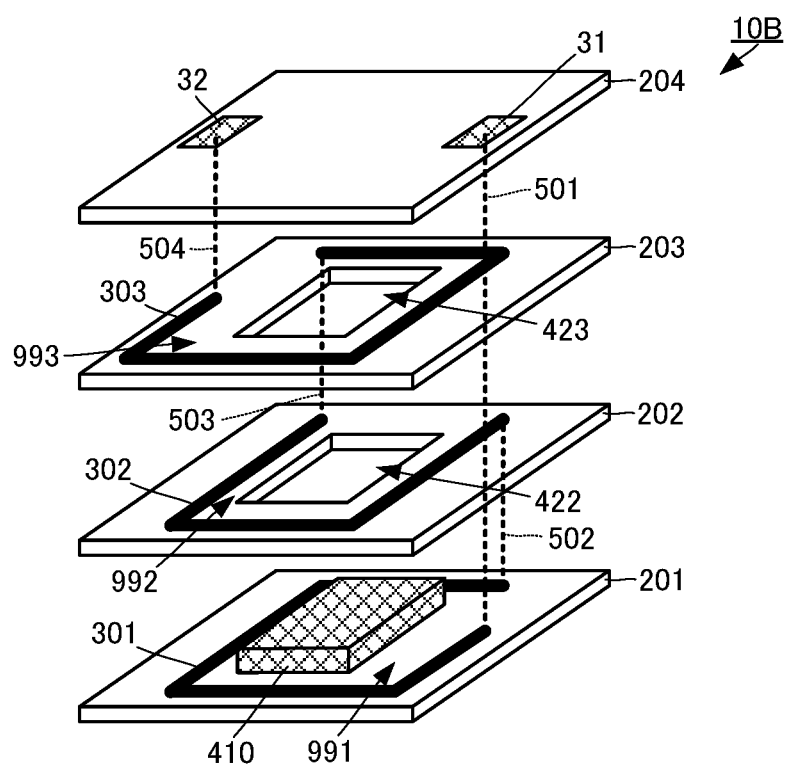
FIG. 6 is an exploded perspective view of the electromagnet according to a third preferred embodiment of the present invention.

Next, an electromagnet according to the third preferred embodiment of the present invention will be described with reference to the drawings. FIG. 6 is an exploded perspective view of the electromagnet according to the third preferred embodiment of the present invention.

An electromagnet 10B according to the present preferred embodiment additionally includes a low mobility member 410 and through-holes 422 and 423 without an intra-layer connection conductor 313 and low mobility members 401, 402 and 403 compared to an electromagnet 10 according to the first preferred embodiment. A basic method of manufacturing the electromagnet 10B according to the present preferred embodiment is also the same as the electromagnet 10 according to the first preferred embodiment. Hereinafter, only differences from the electromagnet according to the first preferred embodiment will be specifically described.

On a surface of an insulating base material 201, the low mobility member 410 having a height equal to or more than thicknesses of thermocompression-bonded insulating base materials 202 and 203 is arranged. In a region of the insulating base material 202 which overlaps an arrangement region of the low mobility member 410, the through-hole 422 is formed. In a region of the insulating base material 203 which overlaps an arrangement region of the low mobility member 410, the through-hole 423 is formed.

According to this configuration, when the insulating base materials 201 to 204 are stacked, the low mobility member 410 fits in the through holes 422 and 423. Further, by performing thermocompression bonding in this stacking state, it is possible to prevent the linear conductors 301, 302 and 303 from moving.

In addition, in the present preferred embodiment, the low mobility member 410 may be made of a material which is a magnetic core of the electromagnet 10B. Consequently, it is possible to improve performance of the electromagnet. The material which is the magnetic core is, for example, metal such as permalloy or ferrite.

Further, each low mobility member described in each of the above preferred embodiments may be made of a material which becomes a magnetic core of the electromagnet unless each low mobility member is integrally formed with each linear conductor, and may be made of a so-called dummy member which simply includes an insulation property and has low mobility.

Figure 7A:
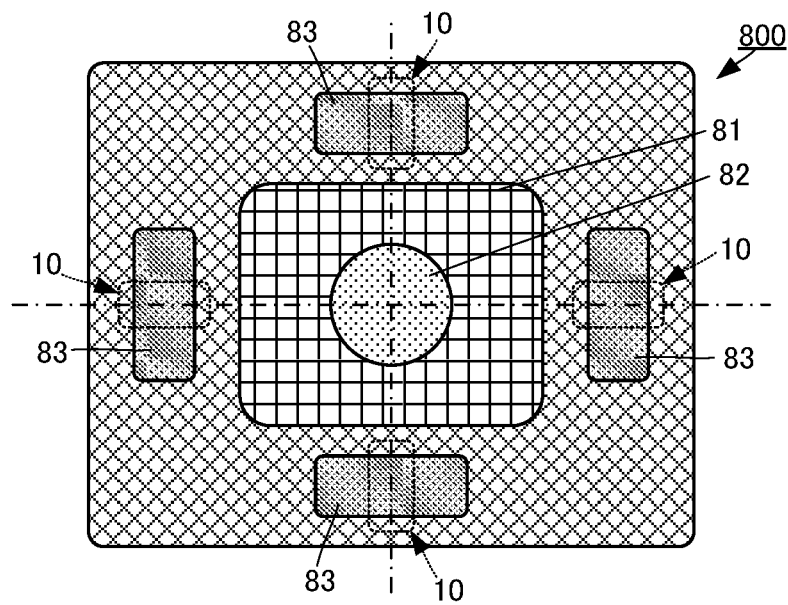
FIGS. 7A, 7B, and 7C are views illustrating configurations of a camera module which uses the electromagnet according to a preferred embodiment of the present invention.
Figure 7B:
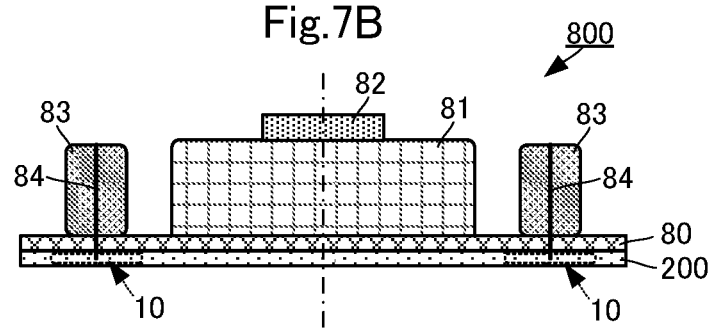
Figure 7C:
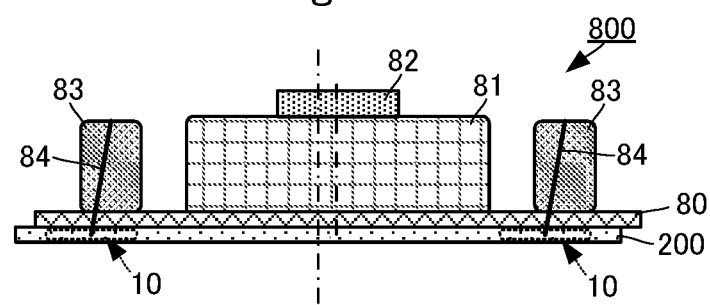
Figure 8:
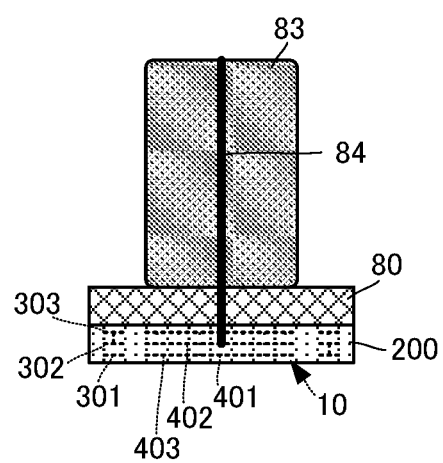
FIG. 8 is a partially enlarged view illustrating arrangement portions of a permanent magnet and the electromagnet in the camera module according to a preferred embodiment of the present invention.

Next, one aspect of an electronic device module which uses an electromagnet according to each of the above preferred embodiments of the present invention will be described. FIGS. 7A, 7B, and 7C are views illustrating configurations of a camera module which uses the electromagnet according to a preferred embodiment of the present invention. FIG. 7A is a plan view of a camera module. FIG. 7B is a side view of a default state of the camera module. FIG. 7C is a side view of a driven state of the camera module. FIG. 8 is a partially enlarged view illustrating arrangement portions of a permanent magnet and the electromagnet in the camera module.

A camera module 800 includes a plurality of electromagnets 10. A plurality of electromagnets 10 is provided in a base substrate 200.

On a surface of the base substrate 200, a frame 80 is arranged. The frame 80 is slidably arranged on the base substrate 200.

The frame 80 is provided with an opening which is not illustrated, and a lens holder 81 is inserted in the opening. The lens holder 81 is fixed to the frame 80. A lens 82 is fixed to an end portion of the lens holder 81 at an opposite side to a base substrate 200 side.

On the surface of the frame 80, a plurality of permanent magnets 83 is arranged so as to surround the lens holder 81. More specifically, the two permanent magnets 83 are arranged along a first direction on the surface of the frame 80 to sandwich the lens holder 81. Further, the two permanent magnets 83 are arranged along a second direction perpendicular or substantially perpendicular to the first direction on the surface of the frame 80 to sandwich the lens holder 81.

A plurality of permanent magnets 83 is arranged to face the electromagnets 10 across the frame 80. A plurality of permanent magnets 83 is connected to the base substrate 200 through wires 84.

According to such a configuration, by applying a current to the predetermined electromagnet 10, an electromagnetic force is applied and the base substrate 200 slides with respect to the frame 80. This slide moves the position of the lens 82. That is, it is possible to define a voice coil motor of the camera.

In addition, when the base substrate 200 is thick, the electromagnets 10 are preferably formed near the surface at the frame 80 side. By forming the electromagnets 10 at these positions, it is possible to realize the camera module 800 more efficiently drives the voice coil motor.

Further, by using the above electromagnets, it is possible to realize the reliable camera module 800.

Furthermore, an aspect where conductors are used as low mobility members has been described in the above preferred embodiment.

However, each low mobility member may be made of ceramics or thermoplastic resin.

An aspect where the low mobility members are left in the stacked body has been described in each of the above preferred embodiments. However, the following manufacturing method may be used for an aspect where the low mobility members are not left in the stacked body.

Figure 9A:
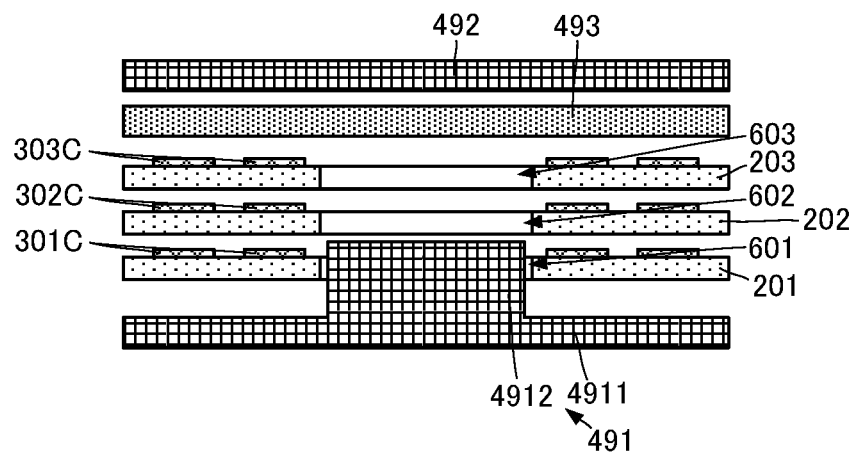
FIGS. 9A, 9B and 9C are views illustrating a concept of an electromagnet manufacturing method according to a fourth preferred embodiment of the present invention, and are side sectional views of the electromagnet formed by the electromagnet manufacturing method.
Figure 9B:
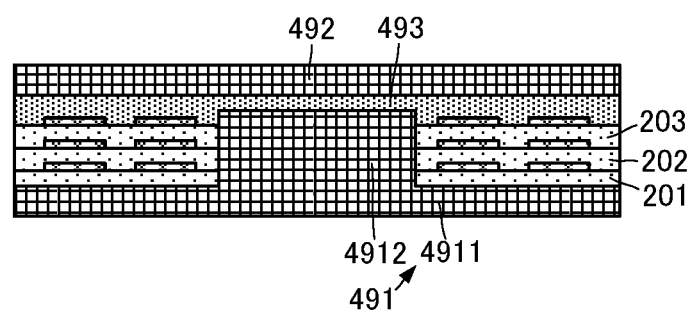
Figure 9C:
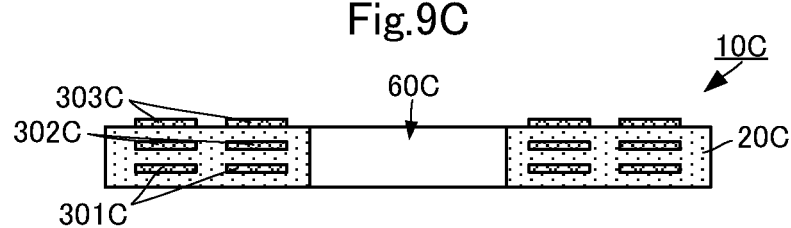

Next, an electromagnetic manufacturing method and an electromagnet according to the fourth preferred embodiment of the present invention will be described with reference to the drawings. FIGS. 9A, 9B and 9C are views illustrating a concept of the electromagnet manufacturing method according to the fourth preferred embodiment of the present invention, and are side sectional views of the electromagnet formed by the electromagnet manufacturing method.

As illustrated in FIG. 9A, a wound linear conductor 301C is formed on the surface of an insulating base material 201. In a region of the insulating base material 201 surrounded by the wound linear conductor 301C, a through-hole 601 is provided.

A wound linear conductor 302C is formed on the surface of an insulating base material 202. In a region of the insulating base material 202 surrounded by the wound linear conductor 302C, a through-hole 602 is provided.

A wound linear conductor 303C is formed on the surface of an insulating base material 203. In a region of the insulating base material 203 surrounded by the wound linear conductor 303C, a through-hole 603 is provided.

As illustrated in FIG. 9A, the insulating base materials 201, 202 and 203 are stacked such that surfaces of the insulating base materials 201, 202 and 203 are parallel or substantially parallel. In this regard, the insulating base materials 201, 202 and 203 are stacked such that positions of the through-holes 601, 602 and 603 match.

Stamps 491 and 492 are pressed against the insulating base materials 201, 202 and 203 stacked in this way, from both sides in the stacking direction. In this regard, the stamp 491 comes into contact with the insulating base material 201 side, and the stamp 492 comes into contact with the insulating base material 203 side. An elastic body 493 is attached between the stamp 492 and the insulating base material 203. The elastic body 493 is made of a material which does not melt at a thermocompression bonding temperature of the insulating base materials 201, 202 and 203.

The stamps 491 and 492 are made of a material (low mobility material) such as metal having mobility lower than that of the insulating base materials 201, 202 and 203 at a temperature upon thermocompression-bonding of the insulating base materials 201, 202 and 203.

The stamp 491 includes a flat main body 4911 and a convex portion 4912 having a shape which projects from a flat surface of the main body 4911. The main body 4911 and the convex portion 4912 may be integrally formed or may be separately formed. When the main body 4911 and the convex portion 4912 are separately formed, materials for the main body 4911 and the convex portion 4912 may be different yet are low mobility members.

The stamp 492 is a flat plate.

The stamp 491 is pressed against the stacked insulating base materials 201, 202 and 203 such that the convex portion 4912 is inserted in the through-holes 601, 602 and 603.

By performing thermocompression bonding in this state, the insulating base materials 201, 202 and 203 melt and adhere to each other as illustrated in FIG. 9B. In this regard, the convex portion 4912 of the stamp 491 is inserted in the through-holes 601, 602 and 603, so that the convex portion 4912 stops movement of the insulating base materials 201, 202 and 203.

By detaching the stamps 491 and 492 and the elastic body 493 after this thermocompression bonding, a stacked body 20C is formed and an electromagnet 100 is formed as illustrated in FIG. 9C. In a region of the stacked body 20C surrounded by the wound linear conductors 301C, 302C and 303C, a through-hole 60C is provided.

Thus, even when a portion of the stamps which thermocompression-bond the insulating base materials 201, 202 and 203 are the above low mobility members, it is possible to prevent the insulating base materials from moving upon thermocompression bonding.

In addition, as described in the present preferred embodiment, the elastic body 493 deforms to alleviate a difference between a height (thickness) of the convex portion 4912 and a thickness of the thermocompression-bonded insulating base materials 201, 202 and 203 by using the elastic body 493 upon thermocompression bonding. Thus, the entire insulating base materials 201, 202 and 203 are thermocompression-bonded at an equal pressing pressure. Consequently, it is possible to more reliably form the stacked body 20C in a desired shape.

Figure 10A:
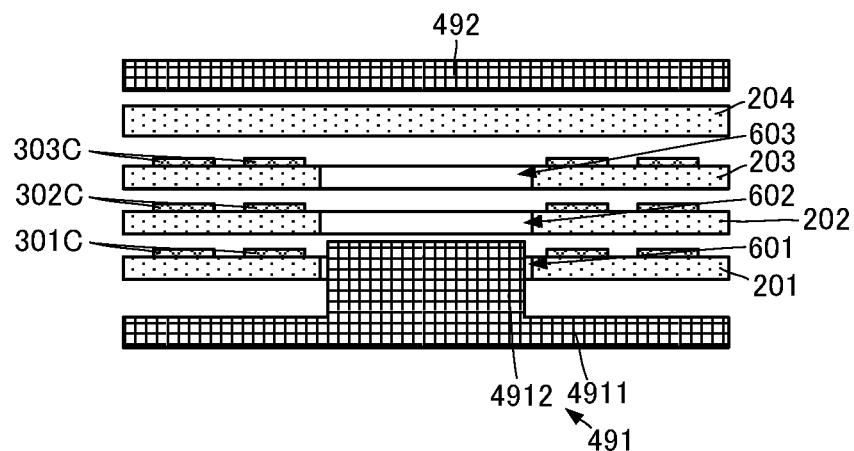
FIGS. 10A, 10B and 10C are views illustrating a concept of an electromagnet manufacturing method according to a fifth preferred embodiment of the present invention, and are side sectional views of the electromagnet formed by the electromagnet manufacturing method.
Figure 10B:
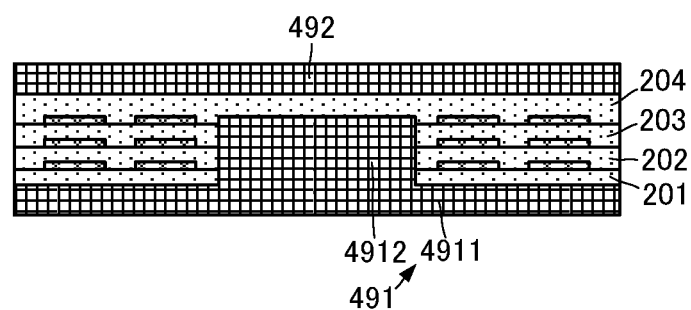
Figure 10C:
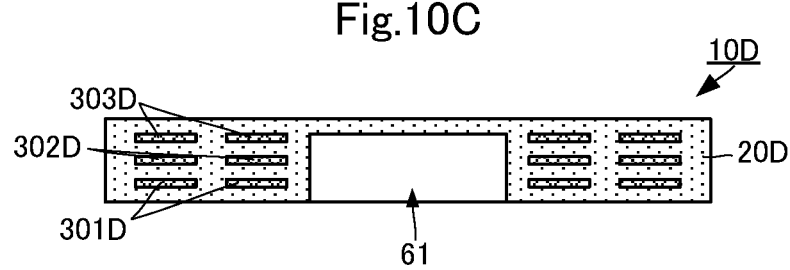

Next, an electromagnetic manufacturing method and an electromagnet according to the fifth preferred embodiment of the present invention will be described with reference to the drawings. FIGS. 10A, 10B and 10C are views illustrating a concept of the electromagnet manufacturing method according to the fifth preferred embodiment of the present invention, and are side sectional views of the electromagnet formed by the electromagnet manufacturing method.

An electromagnet 10D according to the present preferred embodiment differs from an electromagnet 10C according to the fourth preferred embodiment in a structure of a stacked body 20D. Accordingly, a portion of the manufacturing method is also different.

As illustrated in FIG. 10A, the stacked body 20D includes insulating base materials 201, 202, 203 and 204. The insulating base materials 201, 202 and 203 are the same as those of the stacked body 20C according the fourth preferred embodiment. The insulating base material 204 has no linear conductor provided thereon, and is not provided with a through-hole, either. The insulating base material 204 is arranged on the surface of the insulating base material 203.

According to this configuration, a surface at a distal end of a convex portion 4912 of a stamp 491 comes into contact with the insulating base material 204. As illustrated in FIG. 10B, in this state, the stacked insulating base materials 201, 202, 203 and 204 are sandwiched by stamps 491 and 492 and are thermocompression-bonded.

By detaching the stamps 491 and 492 after this thermocompression bonding, the stacked body 20D is formed and the electromagnet 10D is formed as illustrated in FIG. 10C. In a region of the stacked body 20D surrounded by wound linear conductors 301D, 302D and 303D, a concave portion 61 is provided. The concave portion 61 is opened in an outer surface of the stacked body 20D at the insulating base material 201 side, and is not opened in an outer surface at the insulating base material 204 side.

Even this configuration is able to provide the same function and operation as those of the fourth preferred embodiment.

Further, according to the configuration of the present preferred embodiment, the insulating base material 204 which is not provided with a linear conductor and a through-hole contributes to uniform application of a pressure upon thermocompression bonding similar to the elastic body 493 according to the fourth preferred embodiment. Consequently, it is possible to provide the same function and effect as those of the fourth preferred embodiment in this regard, too.

Figure 11:
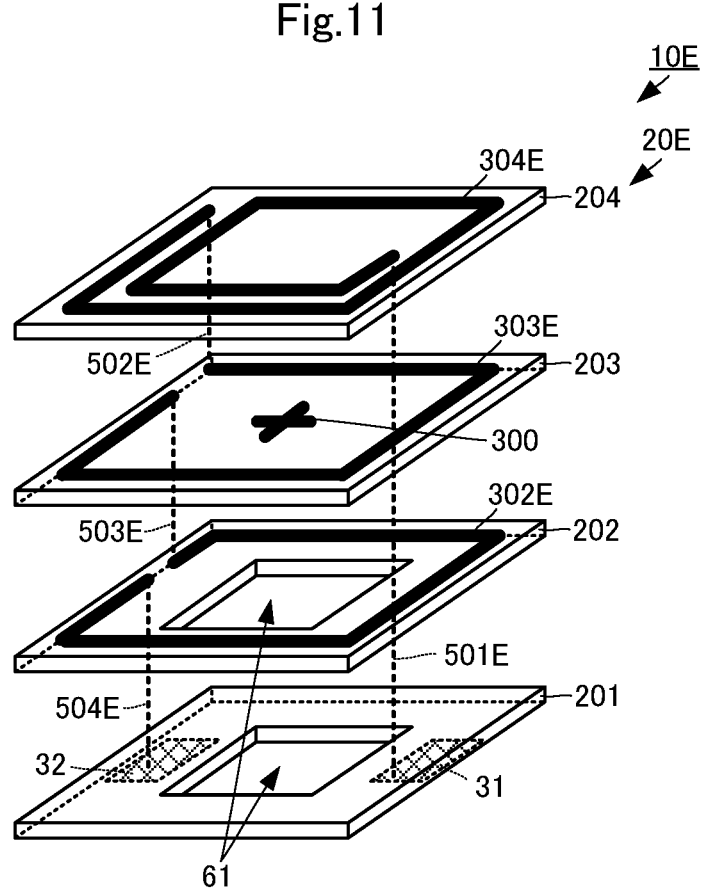
FIG. 11 is an exploded perspective view of an electromagnet according to a sixth preferred embodiment of the present invention.
Figure 12A:
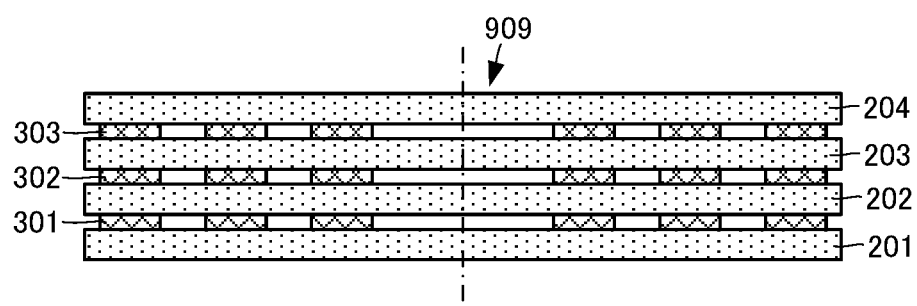
FIGS. 12A and 12B are sectional views illustrating a task of a stacked electromagnet which uses conventional insulating base materials made of thermoplastic resin.
Figure 12B:
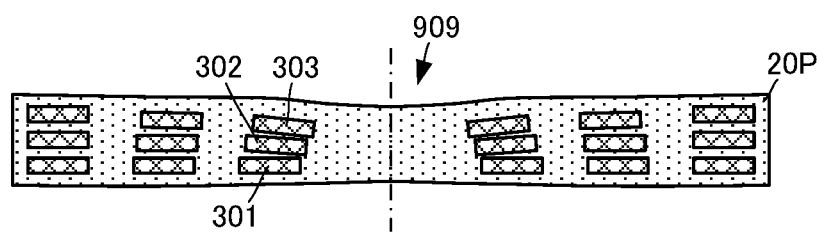

Next, an electromagnet according to the sixth preferred embodiment of the present invention will be described with reference to the drawings. FIG. 11 is an exploded perspective view of the electromagnet according to the sixth preferred embodiment of the present invention.

An electromagnet 10E according to the present preferred embodiment can be formed the manufacturing method according to the fifth preferred embodiment.

The electromagnet 10E according to the present preferred embodiment includes a stacked body 20E. The stacked body 20E is formed preferably by stacking insulating base materials 201, 202, 203 and 204.

On a back surface of the insulating base material 201, external connection conductors 31 and 32 are formed. A wound linear conductor 302E having a shape which extends along an outer circumference of the insulating base material 202 is formed on the surface of an insulating base material 202. A wound linear conductor 303E having a shape which extends along an outer circumference of the insulating base material 203 is formed on the surface of an insulating base material 203. A wound linear conductor 304E having a shape which extends along an outer circumference of the insulating base material 204 is formed on the surface of an insulating base material 204.

One end of the linear conductor 304E is connected to the external connection conductor 31 by a coil connection conductor 501E which penetrates the insulating base materials 201, 202, 203 and 204. The other end of the linear conductor 304E is connected to one end of the linear conductor 303E through by a coil connection conductor 502E which penetrates the insulating base material 204. The other end of the linear conductor 303E is connected to one end of the linear conductor 302E through a coil connection conductor 503E which penetrates the insulating base material 203. The other end of the linear conductor 302E is connected to the external connection conductor 32 through a coil connection conductor 504E which penetrates the insulating base materials 201 and 202.

At a portion of the stacked body 20E corresponding to the insulating base materials 201 and 202, and in a region surrounded by the linear conductor 302E, the concave portion 61 is provided.

Further, at a portion of the stacked body 20E corresponding to the surface of the insulating base material 203, an alignment mark 300 is provided. The alignment mark 300 is a material which provides a desired contrast from insulating base materials, and is made of, for example, the same material as that of the linear conductor 303E. When the same material as that of the linear conductor 303E is used, it is possible to simultaneously form the alignment mark 300 and the linear conductor 303E, so that it is possible to simplify the manufacturing process.

The alignment mark 300 is preferably located in a region which overlaps the concave portion 61E when the stacked body 20E is seen from the stacking direction. That is, the alignment mark 300 is preferably located in a thin region of the stacked body 20E. By arranging the alignment mark 300 in such a thin region, it is possible to easily recognize the alignment mark 300 when mounting the electromagnet 10E on another circuit board. Consequently, it is easy to align the electromagnet 10E to arrange, and prevent misalignment. Consequently, it is possible to increase precision to mount the electromagnet 10E on another circuit board, and more reliably mount the electromagnet 10E.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of manufacturing a stacked body which is formed by thermocompression-bonding a plurality of insulating base materials made of thermoplastic resin and including a wound linear conductor formed on each of the plurality of insulating base materials, and which includes a coil defined by the wound linear conductors, the method comprising:

a step of forming the wound linear conductor on each of the plurality of insulating base materials;

a step of forming a planar conductor surrounded by the wound linear conductor on at least one of the plurality of insulating base materials, the planar conductor being provided on a same insulating base material as the wound linear conductor in a region surrounded by the wound linear conductor, the planar conductor being made of a same material as the wound linear conductor; and a step of stacking and thermocompression-bonding the plurality of insulating base materials; wherein the step of forming the wound linear conductor and the step of forming the planar conductor are simultaneously performed.

2. The method of manufacturing the stacked body according to claim 1, wherein
the planar conductor which is formed in the region surrounded by the wound linear conductor is provided on each of the plurality of insulating base materials; and
the planar conductors are connected by a connection conductor which is elongated in a stacking direction in which the plurality of insulating base materials are stacked.

3. The method of manufacturing the stacked body according to claim 2, wherein the connection conductor which is connected to the planar conductors which are provided in the region surrounded by the wound linear conductor, and a coil connection conductor which connects the wound linear conductor provided on the plurality of insulating base materials and which defines the coil together with the wound linear conductors are simultaneously formed.

4. A stacked body comprising;
a plurality of insulating base materials each made of thermoplastic resin and including a wound linear conductor;
a coil defined by the wound linear conductors and including an axis in a stacking direction in which the plurality of insulating base materials are stacked; and
a planar conductor provided on at least one of the plurality of insulating base materials and made of a same material as a material of the wound linear conductors.

5. The stacked body according to claim 4, wherein
the planar conductor is provided on each of the plurality of insulating base materials in a region surrounded by the wound linear conductor; and
each of the planar conductors is connected by a connection conductor which is elongated in the stacking direction in which the plurality of insulating base materials are stacked.

6. The method of manufacturing the stacked body according to claim 1, wherein the coil defined by the wound linear conductors is a spiral coil.

7. The stacked body according to claim 4, wherein the coil defined by the wound linear conductors is a spiral coil.

* * * * *